Patented Sept. 25, 1945

2,385,533

UNITED STATES PATENT OFFICE 2,385,533

PACKAGE

La Verne E. Cheyney, Akron, and Harold Judson Osterhof, Cuyahoga Falls, Ohio, assignors to Wingfoot Corporation, Akron, Ohio, a corporation of Delaware No Drawing. Original application October 4, 1941, Serial No. 413,655. Divided and this application July 1, 1943, Serial No. 493,110

1 Claim. (Cl. 206—84)

This invention relates to oil containers made from rubber hydrochloride film plasticized with a sebacate of the class consisting of di-2-chloroethyl sebacate and dicyclohexyl sebacate.

The oil container of this invention may be constructed in any suitable way. It may be a stiff container lined with the plasticized material, such as a cylindrical cardboard carton with metal ends. On the other hand, it may be a bag made of the plasticized rubber hydrochloride film. Any suitable bag structure may be used, such as, for example, a bag formed by folding a single sheet of the film and uniting the two sides adjacent the fold to make a bag open on one side. This bag may be squared up by placing it over a mandrel, and then, after filling, it may be sealed by drawing the open side flat and sealing the two surfaces of the film at the mouth.

These sebacates are oil insoluble and water insoluble. They increase the impact strength of rubber hydrochloride film. Rubber hydrochloride plasticized with them may be used in the form of a lacquer for coating the interior of a container, or it may be used as a film not more than .002 inch thick from which a bag may be formed. The bag may be enclosed in a suitable carton.

Although for greatest strength the plasticizer should be used in an amount at least as great as 20 or 30 per cent by weight of the rubber hydrochloride, it is to be understood that smaller amounts may be used where desirable. Rubber hydrochloride plasticized with 30 per cent by weight of the plasticizer, when made into a bag sealed without reentrant folds, is satisfactory for paraffin-base lubricating oils. In general, the plasticized film is also suitable for use with naphthenic-base lubricating oils.

This application is a division of our application Serial No. 413,655, filed October 4, 1941.

What we claim is:

A bag containing lubricating oil, the walls of which are composed of a film of rubber hydrochloride plasticized with about 30% of a sebacate of the class consisting of di-2-chloroethyl sebacate and dicyclohexyl sebacate.

LA VERNE E. CHEYNEY.
HAROLD JUDSON OSTERHOF.